(12) United States Patent
Rutgers et al.

(10) Patent No.: US 10,968,590 B2
(45) Date of Patent: Apr. 6, 2021

(54) MEASUREMENT SYSTEM, LEG GUIDE, JACK-UP PLATFORM

(71) Applicant: GustoMSC Resources B.V., Schiedam (NL)

(72) Inventors: Jochem Rutgers, Schiedam (NL); Andries Johannes Hofman, Schiedam (NL)

(73) Assignee: GUSTOMSC B.V., Schiedam (NL)

( * ) Notice: Subject to any disclaimer, the term of this patent is extended or adjusted under 35 U.S.C. 154(b) by 121 days.

(21) Appl. No.: 16/071,585

(22) PCT Filed: Jan. 23, 2017

(86) PCT No.: PCT/NL2017/050043
§ 371 (c)(1),
(2) Date: Jul. 20, 2018

(87) PCT Pub. No.: WO2017/126971
PCT Pub. Date: Jul. 27, 2017

(65) Prior Publication Data
US 2019/0078280 A1    Mar. 14, 2019

(30) Foreign Application Priority Data

Jan. 22, 2016   (NL) ..................................... 2016138

(51) Int. Cl.
*G01B 5/30*     (2006.01)
*E02B 17/02*    (2006.01)
(Continued)

(52) U.S. Cl.
CPC .............. *E02B 17/021* (2013.01); *B66F 3/02* (2013.01); *E02B 17/08* (2013.01);
(Continued)

(58) Field of Classification Search
CPC .... E02B 17/021; E02B 17/08; E02B 17/0818; E02B 2017/006; E02B 2017/0082; B66F 3/02; G01B 5/30
(Continued)

(56) References Cited

U.S. PATENT DOCUMENTS 4,482,272 A * 11/1984 Colin .................... E02B 17/024
267/121
6,516,749 B1 * 2/2003 Salasidis ............... A61B 5/1118
119/421
(Continued)

FOREIGN PATENT DOCUMENTS

CN     101815826 A     8/2010
CN     102071690 A     5/2011
(Continued)

OTHER PUBLICATIONS

Apr. 28, 2017—ISR and WO PCT-NL2017-050043.

*Primary Examiner* — Max H Noori
(74) *Attorney, Agent, or Firm* — Banner & Witcoff, Ltd.

(57) ABSTRACT

A measurement system that comprises at least one horizontal load measuring unit, that is preferably arranged on the leg guide is provided. The horizontal load measuring device measures or determines horizontal load on the position of the leg where the device is placed, which gives a more accurate indication of the leg bending moment than the rack phase differential measurement. Advantageously, multiple load measuring units can be provided along the leg guide.

20 Claims, 8 Drawing Sheets

Figure 1A:
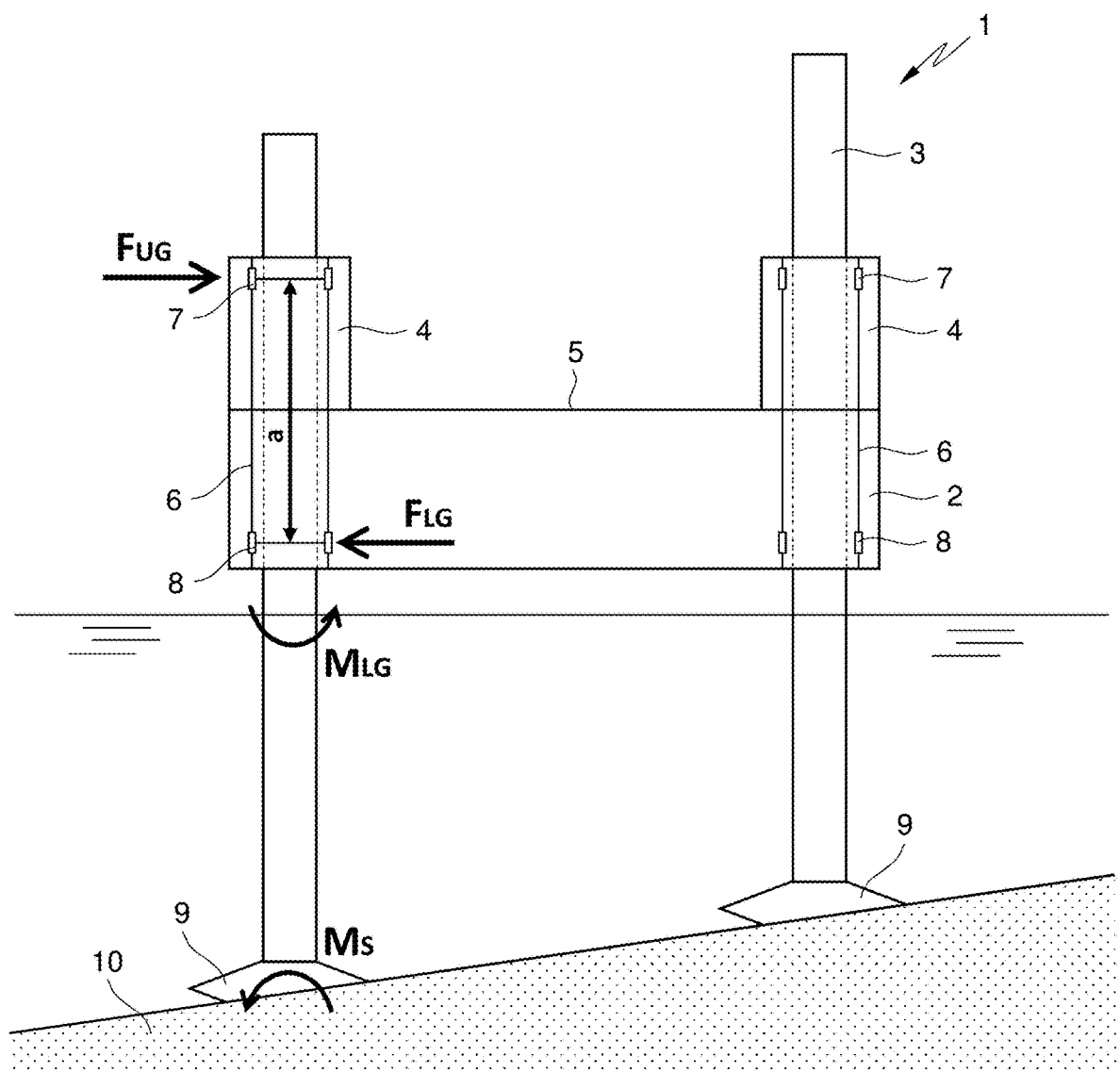

(51) Int. Cl.
    *E02B 17/08*         (2006.01)
    *B66F 3/02*          (2006.01)
    *E02B 17/00*         (2006.01)

(52) U.S. Cl.
    CPC ............ *E02B 17/0818* (2013.01); *G01B 5/30* (2013.01); *E02B 2017/006* (2013.01); *E02B 2017/0082* (2013.01)

(58) Field of Classification Search
    USPC .......................................................... 73/760
    See application file for complete search history.

(56) References Cited

U.S. PATENT DOCUMENTS

| | | | |
|---|---|---|---|
| 2006/0062637 A1 | 3/2006 | Foo et al. | |
| 2006/0082079 A1* | 4/2006 | Eichhorn | B60S 9/12 280/6.155 |
| 2009/0090191 A1 | 4/2009 | Lenders et al. | |
| 2010/0000143 A1* | 1/2010 | Pekin | A01K 89/00 43/17 |
| 2012/0050056 A1 | 3/2012 | Lenders et al. | |
| 2014/0147216 A1* | 5/2014 | Stephens | G01L 5/00 405/196 |
| 2015/0241299 A1 | 8/2015 | Deckers et al. | |
| 2019/0257052 A1* | 8/2019 | Janik | E02B 17/0836 |

FOREIGN PATENT DOCUMENTS

| | | |
|---|---|---|
| CN | 104452718 A | 3/2015 |
| JP | S5854118 A | 3/1983 |
| JP | S5898512 A | 6/1983 |

\* cited by examiner

MEASUREMENT SYSTEM, LEG GUIDE, JACK-UP PLATFORM

CROSS-REFERENCE TO RELATED APPLICATIONS

This application is a U.S. National Stage application under 35 U.S.C. § 371 of International Application PCT/NL2017/050043 (published as WO 2017/126971 A1), filed Jan. 23, 2017 which claims the benefit of priority to Application NL 2016138, filed Jan. 22, 2016. Benefit of the filing date of each of these prior applications is hereby claimed. Each of these prior applications is hereby incorporated by reference in its entirety.

BACKGROUND

Jack-up platforms, such as jack-up rigs and self-elevating vessels, are widely known and typically used offshore for drilling, installation and/or maintenance work. The jack-up platform is temporarily installed at a certain offshore location and can be displaced between subsequent offshore locations. Thereto, the jack-up platform comprises a hull and at least one adjustable leg. Typically, a jack-up platform can comprise three, four or more legs. The legs can be moved relative to the hull by means of a jacking system, shifting between a floating condition and an elevated condition of the jack-up platform.

In the floating condition, the hull is floating and the legs are retracted and extend substantially above the hull. In an intermediate condition, during installation, the legs are lowered to engage the seabed, whilst the hull is still afloat. To ascertain that the seabed will not be overloaded during operation or in severe environment, the jack-up platform is preloaded during installation. During preloading, the vertical load in the legs is significantly increased above the expected static leg load. After preloading, the hull is raised to the desired height, at which the elevated condition is reached.

In the elevated condition, the legs are lowered with a lower end or footing of the legs on or in the seabed, the legs are substantially below the hull and the hull is elevated compared to the floating condition, usually but not necessarily with an air gap with between hull and sea level.

In an intermediate departure condition, when preparing for departure, the hull is lowered back into the water while the legs are still on the seabed. In case a leg or the footing of a leg is stuck in the seabed, the leg must be pulled from the soil. This leg pulling operation is performed by lifting the leg using the jacking system.

During jacking or preloading, such a leg bending moment can be induced as a result of sea bed slope, horizontal leg sliding, or hull inclination. A large, or too large, leg bending moment can result in structural failure of the leg. Rack Phase Difference (RPD) measurement is currently used to indirectly derive an indication of the leg bending moment from, but capability to accurately derive the magnitude of the leg bending moment is limited.

During the leg pulling operation, with a leg footing or lower end of the leg still stuck in the seabed, the operator will increase the pulling force until the leg is freed from the soil. During this process, the combination of soil reaction forces and hydrostatic restoring forces, and wind, wave and current induced loads, creates internal forces between leg and leg guides (part of the hull structure), resulting in a leg bending moment.

During transit, in floating condition, the legs of the jack-up platform extend substantially above the hull. Depending upon sea conditions, the jack-up platform will endure linear and rotational motions. These motions lead to acceleration of the legs and associated inertial forces, again creating internal forces between leg and leg guides, resulting in a leg bending moment.

A too large leg bending moment and/or too large forces between leg guide and leg, can result in structural damage to the leg and/or to the leg guide and/or to the supporting structure such as a jackhouse or other interface structure with the hull.

SUMMARY OF THE INVENTION

It is an object of the invention to provide for a system that obviates at least one of the above mentioned drawbacks. In particular, a system is strived for that may give a relative accurate indication of the leg bending moment.

Thereto, the invention provides for a measurement system comprising at least one parameter measurement unit, that is arranged for measuring a value of a parameter on a leg guide of a jack-up platform exerted by a leg of the jack-up platform with respect to or onto the leg guide. By measuring a parameter, such as horizontal load or vertical load, angle, speed or acceleration of the leg onto or with respect to the leg guide, more information can be obtained about the condition of the leg. Preferably, this information is presented to an operator of the legs of the jack-up platform. The operator may thus have information about the condition of the legs, which he does not have to his availability today. Thus, he can make more judged decisions when operating the legs of the jack-up platform. Having this information available to the operator provides a major advantage compared to the prior art in which no or limited information is available. Advantageously, the measured data are presented to the operator in real time or with a limited time delay so the operator can possess about the actual information to make his decision.

A measurement system can be provided that comprises at least one horizontal load measuring unit, that is preferably arranged on the leg guide. The horizontal load measuring unit or device measures or determines horizontal load on the position of the leg where the device is placed, which gives a more accurate indication of the leg bending moment than the rack phase differential measurement. The horizontal load is understood to be the load exerted in a radial direction with respect to the leg, so when the leg is erected vertically, the load exerted in a radial direction is a horizontal load. Advantageously, multiple load measuring units can be provided along the leg guide. The multiple load measuring units, in particular the load sensing elements thereof, may be distributed along the leg guide in an optimized configuration. For example, when the load sensing element comprises an array of load cells, an optimal configuration would be an orientation of the array of load cells in longitudinal direction of the leg.

The measurement system, also referred to as guide load measurement system, or guide load measurement system, is arranged to determine the horizontal load exerted by a leg of a jack-up platform on a leg guide and/or to determine the occurring leg bending moment. The system can further be arranged to log said horizontal load and/or said leg bending moment and/or to monitor said horizontal load and/or said leg bending moment in relation to one or more predetermined thresholds.

The invention also relates to a guide load measurement system comprising at least one guide load measurement unit which is arranged to determine said horizontal load and/or said leg bending moment. The guide load measurement system can further comprise at least one guide load measurement subsystem per leg, which subsystem consists of at least a guide load measurement unit.

The invention further relates to a guide load measurement system comprising a control system arranged to receive and/or process output from the at least one guide load measurement subsystem and/or the at least one guide load measurement unit. The control system can be arranged to indicate and/or log and/or monitor the horizontal load and/or the leg bending moment of a leg in relation to predetermined thresholds, to alert and/or provide advice to the operator, and/or to intervene in operations. Advantageously, the control system is configured to process the measured data in real time or with a limited time delay. The measurement of the parameters can be done continuously and/or intermittently.

In further embodiments, measurement units measuring other moments and/or forces than the horizontal force may be used as well and/or other parameters, e.g. angle, speed, acceleration, vertical load.

Additionally to monitoring the leg bending moment, the horizontal loads, in particular the loads on the leg guides, may give information about the wear of the leg guide. In particular, information on the wear of the leg guides may be relevant when the leg guides are racks to which pinions may cooperate. When teeth of the rack are worn, the forces on the leg guides may become too high and/or no force transmission between pinion and rack may be obtained, which is undesirable. When monitoring the wear, maintenance intervals may be determined more dependent on the monitored situation. This may be beneficial in terms of downtime and/or costs.

The guide load measurement system provides the operator with an indication of the occurring horizontal forces and/or leg bending moment. The operator can use this information to his advantage to understand the criticality of the current loads in the legs and leg guides and prevent damage to the legs and leg guides during any critical operation which causes significant horizontal load on the unit, with high bending moments as a consequence, such as preloading or leg pulling. Preferably, the guide load measurement system comprises at least one guide load measurement subsystem that is arranged per leg of the jack-up platform. The guide load measurement subsystem comprises at least one measuring unit. Advantageously, per chord of the leg, one measuring unit is provided. A leg of a jack-up platform typically is provided with at least chord, for example one, two, three or four chords may be provided. In some embodiments, more chords may be provided. At least one of these chords is provided with a measurement unit, for example one or two chords may be provided with such a measurement unit, e.g. the chord or chords on which the highest loads may be expected might be equipped with such a measurement unit, whereas the other chord or chords may be without a measurement unit. Similarly, at least one of the legs can be provided with a measurement subsystem, for example the leg on which the highest loads may be expected might be equipped with such a subsystem of at least one measurement unit. Alternatively, two legs may be equipped with such a measurement subsystem of at least one measurement unit forming the measurement system. In another embodiment, all legs may be provided with such a subsystem of at least one measurement unit.

The measuring unit can be provided with load sensing means to measure the horizontal load, or force, exerted by a leg on a leg guide. The measuring unit is preferably arranged at or onto the leg guide to measure the load exerted by the leg onto the leg guide. From the measured forces, the leg bending moment can be calculated and/or determined. The guide load measurement system can indicate and/or log and/or monitor horizontal loads and/or leg bending moments. The guide load measurement system can also be arranged to alert the operator when pre-described thresholds are being exceeded. Preferably, the system can be arranged to provide advice to the operator or even to automatically intervene the operation. Thereto, a control system can be provided that outputs information about leg bending moments and/or other forces to the operator, advantageously via a user interface module. The control system can be an open loop control system, leaving possible intervention to the operator and/or providing a suggested course of action to the operator. Alternatively and/or additionally, the control system can be a closed loop control system, which may intervene operation as soon as pre-determined tresholds may be reached. Also, variants thereof may be possible.

The guide load measurement system can be used to measure and/or log and/or monitor events during transit, installation, elevated operation and departure. For example, during installation, the legs are lowered towards the seabed. This can result in one or more leg to seabed impacts. The impact of a leg or footing with the seabed, can potentially result in large horizontal loads and leg bending moments. Logging and/or monitoring will provide more insight in this event, which can help an operator in determining whether the current operation can be safely continued, the operation needs operator intervention or if structural damage can be expected.

Preloading can be critical for example when preloading on sloping or uneven sea beds. This can induce a large leg bending moment which can result in structural failure of the leg. Industry practice is to use the Rack Phase Difference (RPD) measurement of chord displacements to provide an indication of the leg moment during this phase, but this is relatively inaccurate as it is a rather indirect way of determining the leg bending moment. With the guide load measurement system, the leg moment is calculated more accurately from the measured horizontal load the leg exerts on the leg guide, as well as that the horizontal load can be monitored. During the operation, the operator receives for example critical information about the state of the leg, i.e. the actual leg bending moment in relation to the pre-described thresholds.

Similar to the use of the guide load measurement system during preloading, the guide load measurement system can be used to monitor the leg bending moment during the leg pulling operation. When a leg remains stuck in the seabed, the operator will lift the leg to force the leg free from the soil. Currently, there are no means to advise the operator about arising moments in the leg during the leg pulling operation. The guide load measurement system can advise the operator on the maximum pulling force and prevent any damage to the legs. This may be especially relevant for jack-up platforms which are subject to frequent jacking, e.g. self-elevating vessels used for installing windmills offshore.

During transit, in floating condition, the jack-up platform will endure linear and rotational motions. The acceleration of the legs and associated inertial forces, create internal forces between leg and leg guides, resulting in a leg bending moment. The prolonged and continuously changing motions have a significant impact on the fatigue life of the leg and leg guides. The guide load measurement system can be used to create a time-history for transit fatigue loads and detect overload during heavy sea state.

The load sensing means of the load measuring unit can be of any suitable kind, e.g. transducers that convert an input mechanical force into an electrical output signal, also known as load cells, or any means with which the load can be derived, e.g. means measuring deformation such as strain gauges.

Forces acting between a guide and a leg as well as a leg bending moment can result in structural damage to the leg and/or leg guide and/or supporting structure such as a jack house or other interface with the hull. The load sensing means can be provided at the upper leg guides to measure the horizontal forces exerted by the leg. From the horizontal load on the upper guide, the occurring leg bending moment at the lower guide can be calculated. The load sensing means can also be provided at the lower leg guides to measure the horizontal forces locally exerted by the leg. From the horizontal load on the lower guide, the leg bending moment at the upper guide can be calculated, which is specifically relevant during transit. In a further embodiment load sensing means can be provided at the upper as well as the lower guides.

It is also possible to provide load sensing means on parts of the jacking structure or jack house, to measure loads transferred through the jack house, e.g. with strain gauges measuring deformation caused by said loads. However possible, indication of horizontal load may then be less accurate as it depends on further assumptions of properties of the jacking structure.

In a further embodiment, the guide load measurement system is additionally arranged to measure vertical loads that are exerted on the upper guide wear plates. Vertical leg loads may be measured and/or determined to monitor the leg load against overloading as to prevent failure of the jacking system or the leg by overloading and/or to determine the preload on the seabed. These measurements are clouded by friction forces which are generated in a vertical direction between the leg and the guides. By measuring the vertical loads that are exerted on the upper guide wear plates, the actual vertical leg load can be determined more accurately. Vertical load exerted on the wear plates can be measured using multi-axis load cells or additional load sensing means, such as a load cell.

In a preferred embodiment, the guide load measurement system can incorporate, integrate or cooperate with, additional sensing or detecting means. For example, additional means, such as an inclinometer, can be provided to determine the inclination of the leg, providing further indication of any critical state of the leg and/or the origin of the measured horizontal load and/or the determined leg bending moment, e.g. legs skewed relative to hull caused by wind/wave load. These additional sensing means can be positioned at the leg guide, but can also be positioned elsewhere on the leg and/or the leg opening.

In another example, additional means, such as an encoder or visual detector, can be provided to determine the extension and/or position of the leg relative to the hull or leg guide. Leg position data can be used to determine the exact part of the leg which typically is exposed to horizontal load or leg bending moment.

A measurement system that comprises at least one horizontal load measuring unit, that is preferably arranged on the leg guide is provided. The horizontal load measuring device measures or determines horizontal load on the position of the leg where the device is placed, which gives a more accurate indication of the leg bending moment than the rack phase differential measurement. Advantageously, multiple load measuring units can be provided along the leg guide.

The invention further relates to a leg guide provided with such a load measuring unit and to a jack-up platform provided with such a load measuring system.

The invention also relates to a method for monitoring a bending moment in a leg of a jack-up platform, as well as to a control system.

Further advantageous embodiments are represented in the subclaims.

DESCRIPTION OF THE INVENTION

The invention will further be elucidated on the basis of exemplary embodiments given by way of non-limitative description and illustration.

Figure 1B:
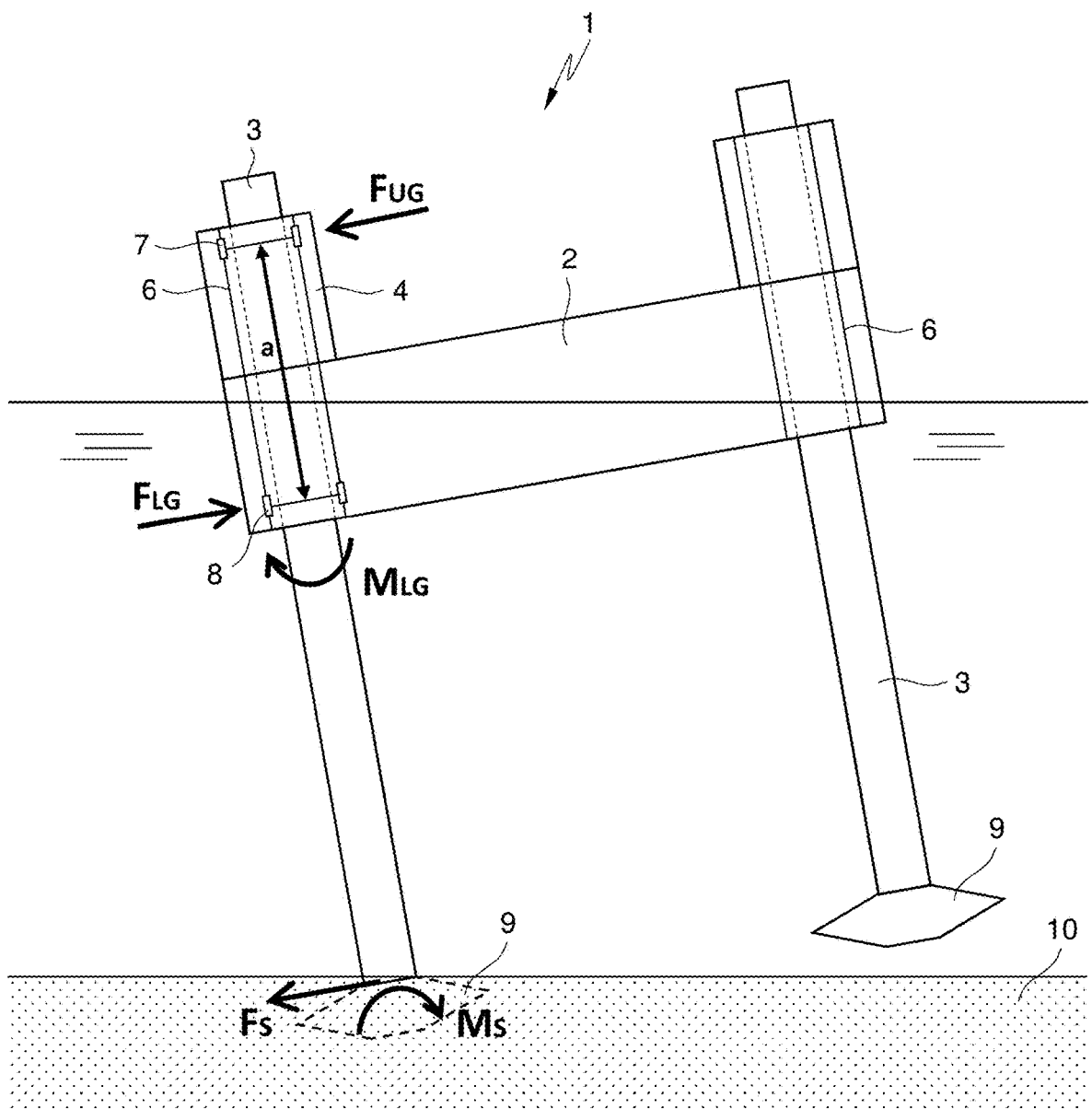
Figure 2A:
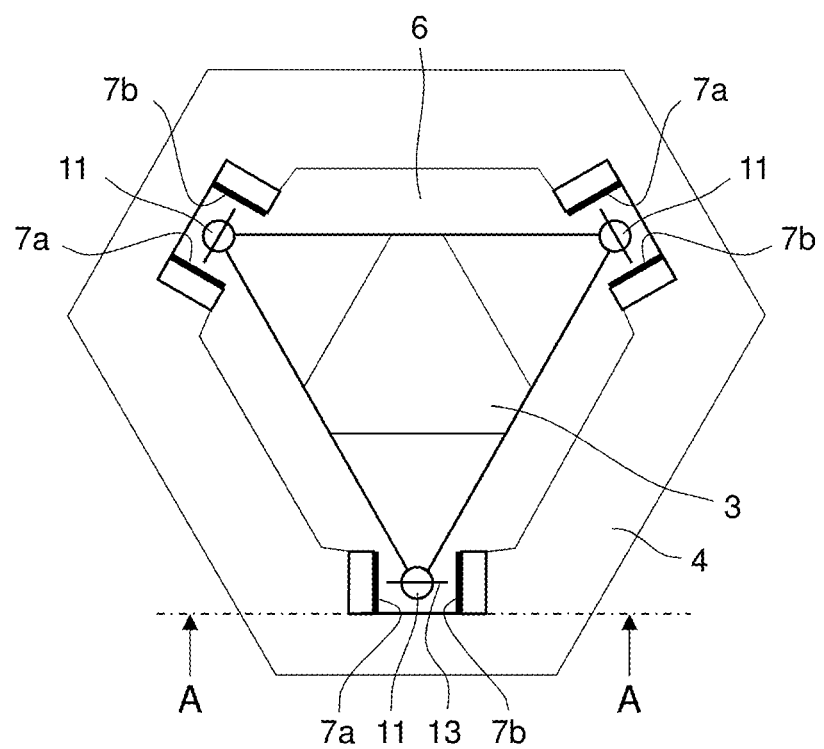
Figure 2B:
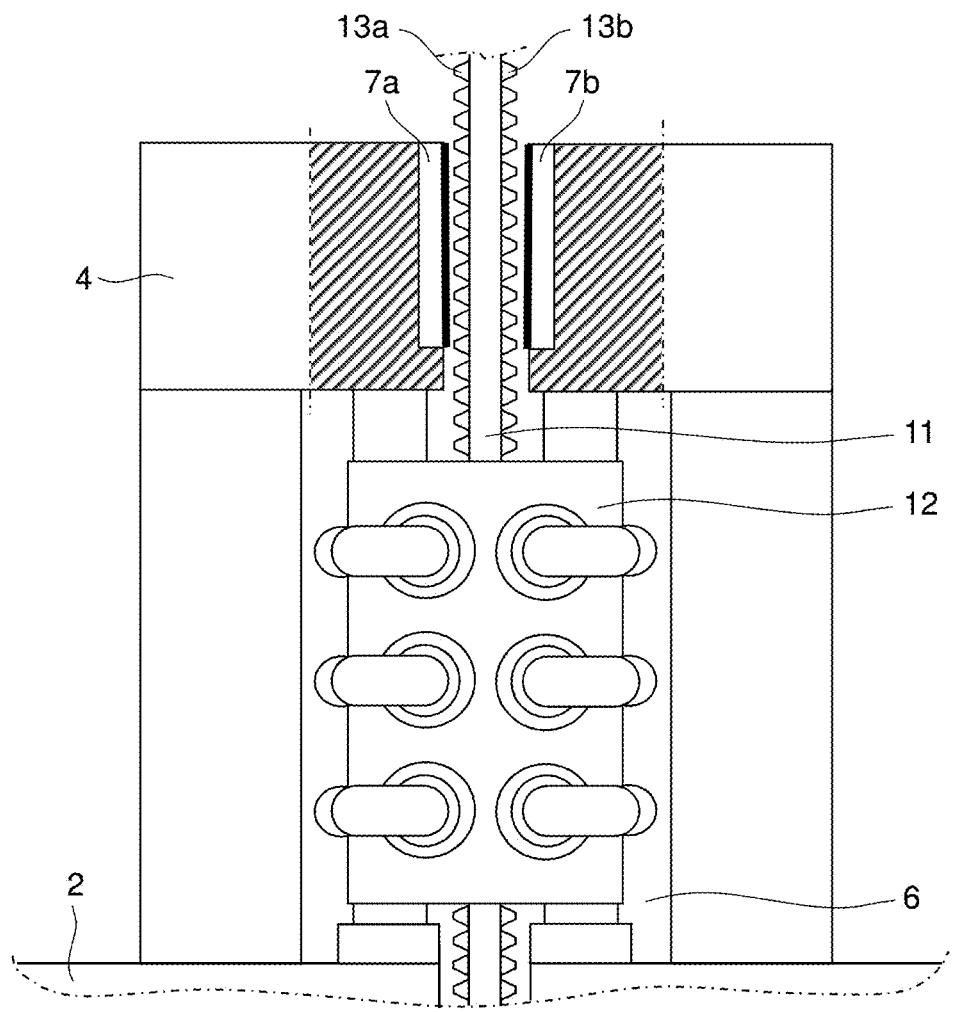
Figure 3:
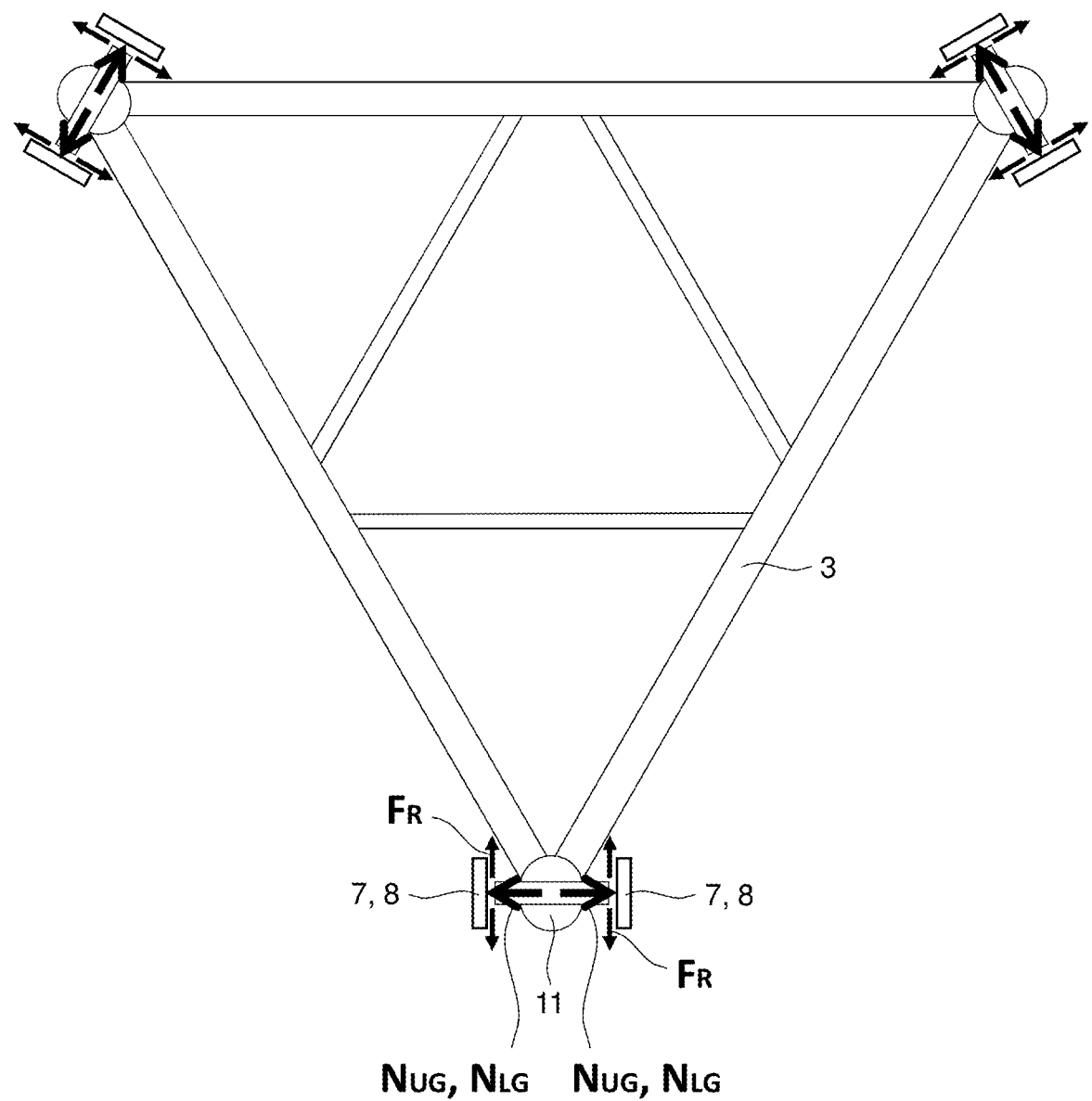
Figure 4A:
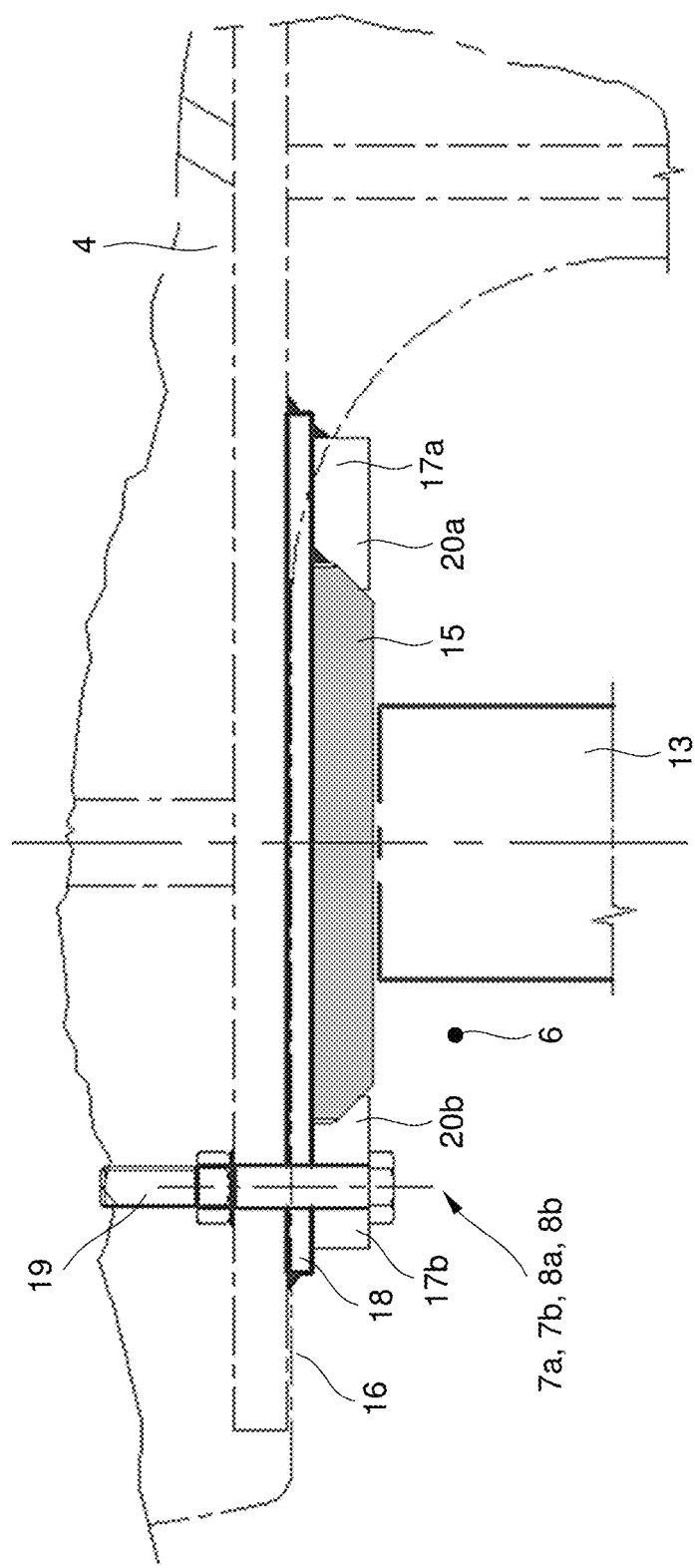
Figure 4B:
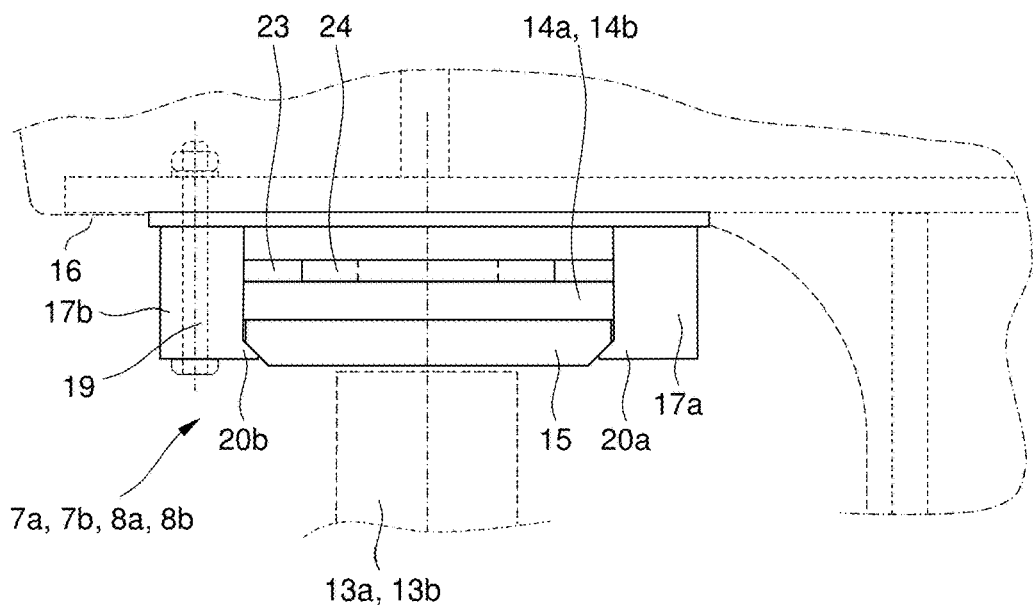
Figure 4C:
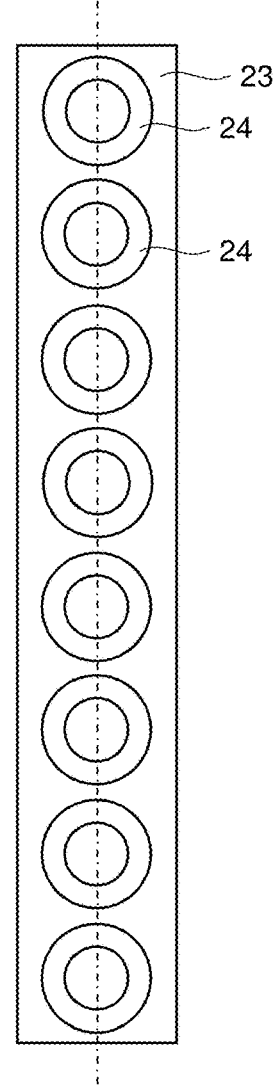
Figure 5:
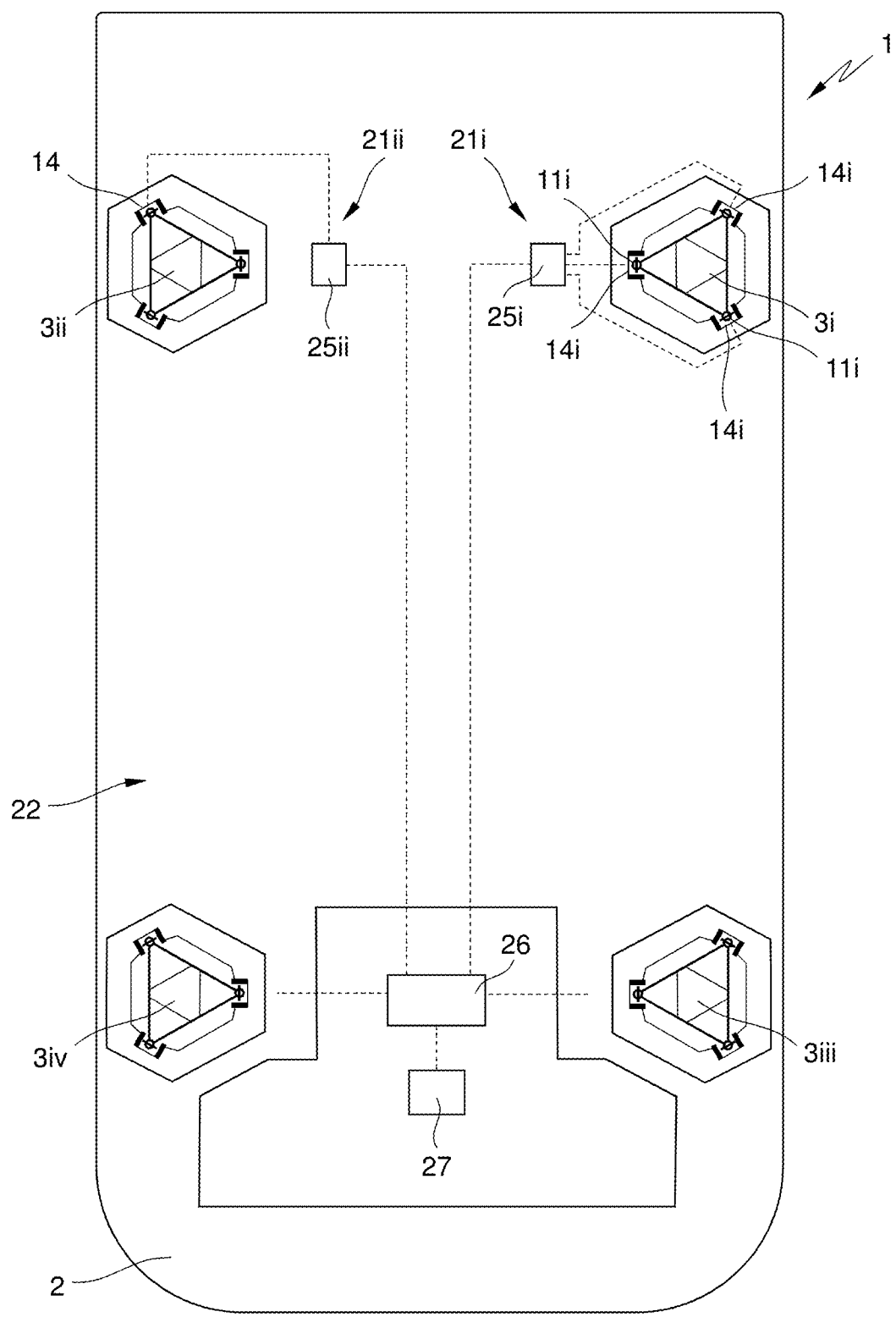

In the illustration shows:

FIG. 1a schematically the forces during a preload operation on a sloping sea bed;

FIG. 1b schematically the forces during a leg pulling operation;

FIG. 2a a schematic top view of a leg in a leg opening of a hull of a jack-up platform;

FIG. 2b a schematic view of the plane A-A to the chord of the leg as indicated in FIG. 2a;

FIG. 3 a schematic representation of the leg loads on the leg guide;

FIG. 4a a leg guide according to the prior art;

FIG. 4b a leg guide provided with a load measuring unit;

FIG. 4c an array of load sensing means of a load measuring unit;

FIG. 5 a general arrangement of a jack-up platform provided with a load measuring system and a control unit therefor.

It is noted that the figures are only schematic representations of embodiments of the invention that are given by way of non-limiting example. Various modifications, variations, and alternatives are possible, as well as various combinations of the features described. The specifications, drawings and examples are, accordingly, to be regarded in an illustrative sense rather than in a restrictive sense.

The guide load measurement system can be used for jack-up platforms with truss type legs as well as for jack-up platforms with tubular type legs or legs with polygonal circumference.

The system described below can be used on jack-up units with truss type legs.

FIGS. 1a and 1b schematically show a jack-up platform 1 having a hull 2 and at least one leg 3. Here, in the side view two legs are shown, the jack-up platform 1 may be equipped with three, four or six legs 3. The legs 3 are at a lower end thereof provided with a leg anchoring structure 9, such as a suction can or any other known structure, to enable anchoring of the leg 3 in the sea bed 10.

The leg 3 is adjustable with respect to the hull 2 by means of a jacking system. The jacking system is here illustrated schematically illustrated by a jacking housing 4, in which the jacking system usually is housed. The jacking housing 4 is here mounted on a deck 5 of the hull 2. The leg 3 is adjustable with respect to the hull 2 through a leg opening 6 in which the leg 3 is mounted. In the leg opening 6, there is provided an upper leg guide 7 and a lower leg guide 8. At the leg guides 7, 8, the leg 3 may have contact with the leg guides resulting in an upper leg guide force $F_{UG}$ and a lower leg guide force $F_{LG}$. These force are exerted by the leg 3 onto the leg guides 7, 8 radially with respect to the leg 3, so when the leg 3 is erected approximately vertical, the forces are in an approximately horizontal plane. The forces $F_{UG}$ and $F_{LG}$ are therefore also denoted as "horizontal forces". Due to the distance "a" between the upper leg guide 7 and the lower leg guide 8, the forces $F_{UG}$ and $F_{LG}$ induce a bending moment in the leg, the so-called leg bending moment $M_{LG}$. On the anchoring structure 9 a counter bending moment $M_S$ is exerted. On the basis of the total upper leg guide horizontal load, the leg moment at the lower guide can be calculated: Lower guide moment=upper guide horizontal×guide distance: $M_{LG}=F_{UG}\times a$. This principle is illustrated in FIGS. 1a and 1b for preload and leg pulling.

An illustration of a typical truss leg and its upper guide locations is shown in FIG. 2. FIG. 2a shows a top view of a jacking housing 4 with a leg 3. The leg 3 is here schematically illustrated as a truss-type leg having a triangular cross-section with a chord 11 on each corner of the triangle. The leg 3 is mounted in the opening 6 extending through the hull 2 and the jacking housing 4. The leg 3 is adjustable with respect to the hull 2, and thus with respect to the leg opening 6 by means of a jacking system 12 as schematically shown in FIG. 2b. Typically, at least one jacking system 12 is provided per chord 11 of the leg 3. The chord 11 can be provided with a jacking guide 13, such as a track, here there is a jacking guide 13a and 13b at opposite sides of the chord 11. In a well known manner, the jacking system 12 can be provided with pinions that cooperate with the track, such that by rotating the pinions along the track, the leg 3 can be moved up or down with respect to the hull 2. Instead of a rack-and-pinion jacking system 12, other jacking systems 12 may be provided, such as a pen-hole system or other systems known to the skilled person. In the view of FIG. 2b, in the plane A-A of FIG. 2a, the jacking housing 4 with the jacking system 12 is shown, and the upper leg guide 7 for guiding the leg 3 at an upper end of the leg opening 6. At a lower end of the leg opening 6, not shown in FIG. 2b, the lower leg guide 8 is provided. In some circumstances, e.g. during adjustment of the leg, or during operations, or due to environmental influences, the leg 3, in particular the leg jacking guide 13 may contact the leg guide 7, thus inducing a force onto the leg guide 7.

As can be seen for example in FIG. 2a, or FIG. 2b, the upper leg guide 7 comprises two opposite leg guide parts 7a, 7b. Each leg guide part 7a, 7b is arranged opposite the leg chord 11, such that sideways contact of the chord 11, in particular of the jacking guides 13a, 13b to the respective leg guide parts 7a, 7b can be accommodated. Similarly, the lower leg guide 8 comprises two leg guide parts 8a, 8b arranged opposite the leg chord 11.

FIG. 3 shows schematically the loads that can act on the leg guides 7, 8, exerted by the leg 3. The total horizontal upper guide load $F_{UG}$ and/or horizontal lower guide load $F_{LG}$ on the leg 3 is the resultant of all normal guide loads $N_{UG}$, $N_{LG}$ plus all friction loads FR on the upper leg guide 7 and the lower leg guide 8 respectively.

Despite the grease that is applied on the leg guides 7, 8 during jacking, friction may occur between the leg 3, in particular rack 13, and the leg guides 7, 8. This friction FR will take part of the horizontal load acting on the leg guides 7, 8. The actual amount of friction is difficult to determine, but the friction coefficient is estimated to vary between 0.0 and 0.4.

It is advantageous to measure the loads occurring on the leg guides and, preferably, to determine the leg bending moment therefrom. Thus, information may be retrieved about the loading and/or wear of the leg. Such information may be presented to an operator, for example to a user interface of the operator. Such a user interface can be any type of device, e.g. an information panel in the operator cabin, or a mobile communications device available to the operator. Thereto, the leg guide 7, 8, in particular a leg guide part 7a, 7b, 8a, 8b, may be provided with a measurement unit 14. FIG. 4a shows a prior art arrangement of a leg guide part 7a, 7b, 8a, 8b having a wear plate 15 that is arranged for coming into contact with the jacking guide 13a, 13b of the leg chord 11. The leg guide 7, 8 with the wear plate 15 is mounted on a side wall 16 of the opening 6.

When the jack-up platform is equipped with tubular legs, wear plates may not be present at the upper guides. In that case an additional collar can be provided, mounted to the upper guide structure and interacting with the tubular leg by means of at least one contact element. Similar to the wear plate construction for truss type legs, load sensing means are provided between the contact element(s) and the upper guide structure.

According to the invention, the leg guide 7, 8 is provided with a measurement unit 14 that is arranged between the wear plate 15 of the leg guide 7, 8 and the side wall 16 of the opening 6. The wear plate 15 is mounted to the side wall 16 by means of mounting elements 17a, 17b. The mounting element 17a is fixedly arranged to a guide plate 18. The guide plate 18 is, preferably fixedly mounted to the side wall 16 of the opening 6, and is provided to distribute loads to the surrounding structure. The wear plate 15 is removable mounted to the side wall 16, such that, when the wear plate 15 is worn, it can easily be replaced by an other wear plate 15. The mounting element 17b is thereto removable attached to the side wall 16 by means of a connecting element 19, here a bolt-and-nut system 19. The mounting elements 17a, 17b have outer ends 20a, 20b respectively that are, in this embodiment, wedge shaped as to clampingly engage the wear plate 15. So, by removing the removable mounting element 17a, the wear plate 15 comes free and can be removed and replaced. According to the invention, the leg guide 7, 8 is provided with a measurement unit 14. Preferably, each leg guide part 7a, 7b or 8a, 8b is provided with a measurement unit part 14a, 14b respectively. As such, the measurement unit 14 can be provided on a leg guide of a single chord. While corresponding to a single chord 11 two opposite leg guide parts 7a, 7b; 8a, 8b are provided, each leg guide part 7a, 7b; 8a, 8b is equipped with a measurement unit 14a, 14b respectively.

The measurement unit part 14a, 14b is mounted between the guide plate 18 and the wear plate 15. Advantageously, there is provided a measurement unit 14 per chord 11 of a leg 3, comprising at least one, preferably two opposite, leg guide part 14a, 14b. So, when a leg 3 has three chords, three measurement units 14 are provided on said leg 3. These three measurement units 14 form a guide load measurement subsystem 21. Per leg 3, a guide load measurement subsystem 21 is thus provided. When there are three legs on the jack-up platform, there are three subsystems 21. Equally, when there are four legs 3, four subsystems 21 are provided. The subsystems 21 together form the guide load measurement system 22.

The guide load measurement unit 14a, 14b, as shown in FIG. 4b, comprises load sensing elements 23, such as an array of load cells 24 as shown in FIG. 4c. Other variants of load sensing elements 23 may be provided, e.g. of the strain gauge, pneumatic or hydraulic type, or any other suitable type. Preferably, at least one load sensing element 23 per upper leg guide part 7a, 7b is provided. Preferably, an array of load cells is used to share the load which is distributed through the guide wear plates 15.

In case the guide load measurement system only measures the normal guide loads $N_{UG}$, $N_{LG}$, the error in the moment calculation can reach up to 20%, at a conservative friction coefficient of 0.4. In this case for example single axis load cells can be used. In a preferred embodiment the guide load measurement system also measures the friction, i.e. the load perpendicular to the normal load in the horizontal plane. For measuring both normal and friction loads, sets of single axis load cells positioned in normal and perpendicular directions with respect to the leg 3 or multi-axis load cells can be provided.

In a preferred embodiment, the guide load measurement system comprises at least one guide load measurement subsystem per leg of the jack-up platform. Each guide load measurement subsystem comprises at least one guide load measurement unit comprising the sensing means per leg, and possibly a local data processing unit and/or transmitter. The guide load measurement units comprise the load sensing means per chord of a leg. As shown in FIG. 5, the jack-up platform 1, here provided with four legs 3, is provided with a measurement system 22. The measurement system 22 comprises the assembly of available measurement subsystems 21 which may comprise at least one measurement unit 14. The measurement unit 14 comprises at least one load sensing element 23. In the embodiment of FIG. 5, one leg 3i is provided with a measurement subsystem 21i. Each chord 11i of the leg 3i is provided with a measurement unit 14i. The measurement unit 14i can measure values of parameters such as load, but also inclination, speed, acceleration etc. The values of the measured parameters are collected at a subsystem control unit 25i. The subsystem control unit 25i may be configured to process the received measurement data, e.g. may determine a bending moment or may determine an angle of inclination, but, alternatively, may be configured to store the data and/or to output the measured data to the guide load measurement control system 26. Depending on the configuration, the guide load measurement control system 26 receives already processed measurement data, or may receive unprocessed measurement data and may be configured to process the measurement data. Also, the measurement control system 26 may be configured to further process already processed measurement data, for example by presenting them to the operator in a comprehensive manner, e.g. graphically. Also, the control system 26 may be configured to provide a warning signal when the value of a certain parameter exceeds a predetermined threshold. The warning signal may be visual or auditive. A visual warning signal may be a warning lamp installed on the respective leg and/or chord, or may be a warning lamp on the operator's operation panel 27, or may be a visual signal on the operator's user interface panel etc. For the auditive signal, the same possibilities arise, e.g. an auditive signal from a horn on the leg and/or chord itself, or an auditive signal on the operator's operation panel, or may be an auditive signal on the operator's user interface panel etc. Of course the warning signal may be audiovisual as well. The operator's operation panel 27 may be a well known operation panel having the required buttons and/or joysticks to operate the legs of the jack-up platform. The operation panel 27 may also comprise a user interface panel, which may allow interactive operation of the legs of the jack-up platform. The user interface panel may comprise a screen on which information can be presented or even a touch screen to also allow input of information or controls. The user interface panel may also be an application on a mobile communications device.

As shown in FIG. 5, the leg 3ii is here provided with a measurement subsystem 21ii, having a control unit 25ii. The control unit 25ii here receives only measurement data from the single measurement unit 14ii, as a single chord 11ii of the leg 3ii is only equipped with a measurement unit 14ii. The leg 3iii and the leg 3iv are in this embodiment not equipped with a measurement subsystem. The guide load measurement control system 26 therefor receives input from the measurement subsystem 21i and the measurement subsystem 21ii. It may be understood that variants are possible, for example can all legs be equipped with a measurement subsystem 21i as for leg 3i, or alternatively with a measurement subsystem 21ii as for leg 3ii, or any variants in between. Also, it may be understood that the subsystem control unit 25 can be obviated and that the measured data from the measurement subsystem 21 can be directly inputted to the control system 26 which can be configured to process these inputted data. Many variants thereof are possible.

In an embodiment, a guide load measurement unit consist of a sandwich of plates with dual- or multi-axis load cells in between. The sandwich will be placed behind the wear plate, over the full height of this plate. An example of a construction of the guide load measurement unit within the guide structure is shown in FIG. 4b. For example, an upper guide wear plate is around 300 mm wide and 2000 mm high, dependent on the leg dimensions, and may have eight load cells behind it. The approximate capacity of a single load cell can be 200 t.

In another embodiment, a similar construction of a guide load measurement unit can be applied to the lower guides. In a further embodiment both upper and lower guides are equipped with guide load measurement units.

In a further example, the guide load measurement system can cooperate with sensing or detecting means which may already be provided for and primarily serve another purpose, such as means to determine the vertical leg load or Rack Phase Difference (RPD). The output of these sensing or detecting means can be integrated in the guide load measurement system providing further information on the state of the leg and/or the origin of the measured horizontal load and/or the determined leg bending moment (e.g. leg sliding).

The output of additional or available sensing means can be received and/or logged and/or monitored by the guide load measurement system, and integrated or combined with the output from the load sensing means and/or other additional sensing means. The control system of the guide load measurement system can receive and/or process the output of all sensing means and/or subsystems to detect specific events, such as leg sliding and hull inclination.

In another preferred embodiment the guide load measurement system comprises a control system which can monitor a single leg, or all legs of a jack-up platform at the same time. Data can be received from each leg's guide load measurement subsystem and can be further processed by a central data processing unit to alert or to advise the operator to take specific action, or even to automatically intervene operations.

It is to be noted that the figures are only schematic representations of embodiments of the invention that are given by way of non-limiting examples. For the purpose of clarity and a concise description, features are described herein as part of the same or separate embodiments, however, it will be appreciated that the scope of the invention may include embodiments having combinations of all or some of the features described. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain features are recited does not indicate that a combination of these features cannot be used to an advantage. Many variants will be apparent to the person skilled in the art. All variants are understood to be comprised within the scope of the invention.

The invention claimed is:

1. Measurement system comprising at least one load measuring unit connected to a leg guide of a jack-up platform, for measuring a horizontal load to determine a leg bending moment of a leg of the jack-up platform.

2. Measurement system according to claim 1, wherein the load measuring unit, is configured for measuring the horizontal load exerted by the leg of the jack-up platform onto the leg guide.

3. Measurement system according to claim 1, further comprising at least one parameter measuring subsystem of said at least one load measuring unit, provided per leg of the jack-up platform.

4. Measurement system according to claim 1, wherein the system further is configured to log the horizontal load and/or the leg bending moment exerted by the leg onto the leg guide.

5. Measurement system according to claim 1, wherein the system is configured to monitor the value of said horizontal load in relation to one or more predetermined thresholds.

6. Measurement system according to claim 3, further comprising a control system configured to receive and/or process output from the load measuring unit and/or parameter measuring subsystem.

7. Measurement system according to claim 6, wherein the control system is configured to indicate and/or log and/or monitor the value of the horizontal load.

8. Measurement system according to claim 1, wherein the load measuring unit comprises at least one load sensing element to measure a load in a substantially radial direction of the leg onto the leg guide.

9. Measurement system according to claim 1, wherein the load measuring unit is configured to be mounted to a wear plate of the leg guide of the jack-up platform, between a wall of a leg opening and the wear plate of the leg guide.

10. Leg guide for mounting on a hull of a jack-up platform, configured for guiding a leg during movement of the leg with respect to the hull, wherein the leg guide is provided with the measurement system of claim 1, comprising said at least one load measuring unit for measuring said horizontal load to determine the leg bending moment.

11. Jack-up platform comprising a hull and at least one leg adjustable with respect to the hull, wherein the leg is adjustable through a leg opening in the hull, said leg opening comprising a leg guide to guide the leg during adjustment, wherein the leg guide is provided with the measurement system of claim 1, comprising said at least one load measuring unit for measuring the horizontal load to determine the leg bending moment.

12. Jack-up platform according to claim 11, wherein the leg opening comprises said leg guide at an upper end of the leg opening and/or comprises said leg guide at a lower end of the leg opening, wherein said leg guide at said upper end and/or said lower end is provided with the at least one load measuring unit.

13. Method for monitoring a bending moment in a leg of a jack-up platform, comprising:
providing a load measuring unit connected to a leg guide of the jack-up platform;
measuring, using said load measuring unit, a horizontal load of the leg onto the load measuring unit;
determining the bending moment in the leg based on the horizontal load.

14. Control system for the measurement system according to claim 1, wherein the control system is configured to receive said horizontal load measured by the load measuring unit, further is configured to determine said leg bending moment based on the horizontal load, further is configured to output the leg bending moment of the leg to a user interface.

15. The jack-up platform of claim 11, further comprising at least one parameter measuring subsystem of said at least one load measuring unit, and a control system configured to receive and/or process output from the at least one load measuring unit and/or the parameter measuring subsystem.

16. The jack-up platform of claim 15, wherein the control system is configured to indicate and/or log and/or monitor the value of the horizontal load in relation to predetermined thresholds.

17. The jack-up platform of claim 15, wherein the control system is configured to alert and/or provide advice to an operator or to intervene in operations.

18. The jack-up platform of claim 11, wherein the load measuring unit comprises at least one load sensing element to measure a load in a substantially radial direction of the leg onto the leg guide.

19. The jack-up platform of claim 18, wherein the at least one load sensing element is a load cell.

20. The jack-up platform of claim 11, wherein the load measuring unit is configured to be mounted to a wear plate of the leg guide of the jack-up platform, between a wall of a leg opening and the wear plate of the leg guide.

* * * * *